United States Patent
Clewes et al.

(10) Patent No.: US 6,411,861 B1
(45) Date of Patent: Jun. 25, 2002

(54) METHOD AND APPARATUS FOR GRINDING COMPOSITE WORKPIECES

(75) Inventors: Stuart Clewes, Keighley; John David Pickles, Skipton, both of (GB)

(73) Assignee: Unova U.K. Ltd., Aylesbury (GB)

( * ) Notice: Subject to any disclaimer, the term of this patent is extended or adjusted under 35 U.S.C. 154(b) by 0 days.

(21) Appl. No.: 09/011,081

(22) PCT Filed: Apr. 22, 1997

(86) PCT No.: PCT/GB97/01109

§ 371 (c)(1),
(2), (4) Date: Jan. 27, 1998

(87) PCT Pub. No.: WO97/40432

PCT Pub. Date: Oct. 30, 1997

(30) Foreign Application Priority Data

Apr. 23, 1996 (GB) .............................................. 9608351

(51) Int. Cl.[7] .......................... G06F 19/00; B24B 49/00
(52) U.S. Cl. ........................ 700/164; 700/175; 700/193; 451/5; 451/11
(58) Field of Search .................................. 700/164, 175, 700/187, 193; 451/5, 9, 10, 11

(56) References Cited

U.S. PATENT DOCUMENTS

| | | | | |
|---|---|---|---|---|
| 4,366,543 A | * | 12/1982 | Feller et al. ................. | 700/193 |
| 4,885,874 A | * | 12/1989 | Wedeniwski .................... | 451/5 |
| 5,212,648 A | * | 5/1993 | Sugita et al. ............... | 700/193 |
| 5,289,660 A | * | 3/1994 | Terasaki et al. .............. | 451/49 |
| 5,315,789 A | * | 5/1994 | Takashi .......................... | 451/5 |
| 5,396,434 A | * | 3/1995 | Oyama et al. ............... | 700/193 |
| 5,465,474 A | * | 11/1995 | Kimura et al. ............... | 29/6.01 |
| 6,113,461 A | * | 9/2000 | Onoda et al. .................. | 451/5 |
| 6,205,371 B1 | * | 3/2001 | Wolter-Doll ................. | 700/174 |

FOREIGN PATENT DOCUMENTS

| | | |
|---|---|---|
| DE | 29 36 251 | 4/1980 |
| DE | 196 21 239 | 1/1997 |
| EP | 0 318 353 | 11/1988 |
| EP | 0 469 439 | 2/1992 |
| EP | 0 576 043 | 12/1993 |
| FR | 2 426 534 | 5/1978 |
| FR | 2 550 720 | 2/1985 |
| GB | 2 206 067 | 12/1988 |
| GB | 2 219 231 | 12/1989 |
| GB | 2 300 582 | 11/1996 |
| JP | 54057285 | 5/1979 |

* cited by examiner

*Primary Examiner*—Leo P. Picard
*Assistant Examiner*—Paul Rodriguez
(74) *Attorney, Agent, or Firm*—Lee, Mann, Smith, McWilliams, Sweeney & Ohlson

(57) ABSTRACT

A method is described for grinding a composite workpiece to form a component having concentric and eccentric cylindrical regions. The method comprises mounting the workpiece in a computer controlled grinding machine having a grinding wheel the advance and withdrawal of which is controllable by a program entered into the controlling computer, loading a wheelfeed controlling program into the computer, relatively positioning the grinding wheel and the workpiece to align the wheel with a first selected region of the workpiece, advancing the grinding wheel towards the selected region so as to grind the surface thereof, controlling the wheelfeed so as to maintain grinding contact between the grinding wheel and the workpiece so as either to grind a concentric cylindrical region thereon or an offset cylindrical region thereon as required, information about each selected region of the workpiece being stored in the computer and addressed as appropriate so that the wheelfeed can be controlled appropriately depending on whether a selected workpiece region is to be ground as a concentric or an offset cylindrical region. The method allows a workpiece having both concentric and offset cylindrical regions thereon to be ground using a single grinding machine under computer control without demounting the workpiece from the machine. A computer controlled grinding machine is described as are programs for controlling the machine.

12 Claims, 4 Drawing Sheets

METHOD AND APPARATUS FOR GRINDING COMPOSITE WORKPIECES

FIELD OF INVENTION

This invention concerns methods and apparatus for grinding of workpieces to form components which include both concentric and eccentric cylindrical regions. Such a component is an internal combustion engine crankshaft which includes both concentric journal bearing regions and eccentric crankpins. The invention is applicable to any such workpiece which is to be ground to size and finish, and such workpieces will be referred to herein as composite workpieces.

BACKGROUND TO THE INVENTION

Historically workpieces of this nature have been ground on two grinding machines. A first grinding machine has been used to grind the concentric cylindrical sections and a second grinding machine has been used to grind the eccentric cylindrical sections.

In the first grinding machine the workpiece is rotated about its primary axis and each of the concentric sections are ground by moving a grinding wheel into a grinding position and removing material from the workpiece to produce a concentric cylindrical region thereon, in a conventional manner.

In the second grinding machine, two approaches have been adopted. In one approach the workpiece has been rotated about the axis of each eccentric region in turn, and conventional cylindrical grinding is employed to remove material so as to produce a cylindrical bearing surface at each eccentric region, just as if the element were a concentric cylindrical region of an overall workpiece. In the second approach, the workpiece has been rotated about its primary axis so that the eccentric regions precess eccentrically around the primary axis of rotation, as for example do the crankpins of a crankshaft when the latter is mounted in and is rotated in an engine. In this second approach the grinding wheel has been aligned with an eccentric region and then been advanced and retracted under computer control in synchronism with the precession of the eccentric region so that the grinding wheel remains in contact therewith at all times. The region is thereby ground at all positions of its precession. As each eccentric region is ground to size, the grinding wheel is withdrawn and the workpiece or grinding wheel is repositioned axially so that another eccentric region is aligned with the grinding wheel, ready for a similar grinding operation at the new location.

A process requiring two grinding machines involves considerable down-time as components are moved from one machine to another.

During any grinding operation, but particularly noticeable when grinding regions of an elongate workpiece (such as a crankshaft) which is supported for grinding at its ends, unwanted eccentricity may be introduced into the workpiece due to forces acting on the workpiece during the grinding process. This eccentricity which is termed runout tends to be more noticeable in concentrically ground cylindrical regions of the workpiece. It often appears as a consequence of stress relieving the workpiece, after grinding, and any eccentricity introduced into concentrically ground journal bearing regions a crankshaft will introduce undesirable wear in the component when mounted and rotated in use.

It is one object of the invention to reduce the machining time required to machine composite workpieces containing both concentric and eccentric regions, such as crankshafts which contain concentric journal bearing regions and eccentric crankpins.

It is a subsidiary object of the invention to reduce unwanted eccentricity of concentrically ground cylindrical regions of a composite workpiece such as concentric cylindrical bearing regions.

It is a further object to provide a method and apparatus which will not only reduce machining time of composite workpieces but also allows eccentricity correction to be applied to both concentrically and eccentrically ground cylindrical workpiece regions such as the joined bearing regions and the workpiece of an engine crankshaft.

SUMMARY OF THE INVENTION (a) Composite Workpiece Grinding in Accordance With the Invention A method of grinding a composite workpiece to form a component having concentric and eccentric cylindrical regions, comprises, mounting the workpiece in a computer controlled grinding machine having a grinding wheel the advance and withdrawal of which is controllable by a program entered ito the machine controlling computer, loading a wheelfeed controlling program into the computer, positioning the grinding wheel relative to the workpiece, or the workpiece relative to the grinding wheel, so that the wheel is aligned with a first selected region of the workpiece, advancing the grinding wheel towards the selected region so as to grind the surface thereof, controlling the wheel feed so as to maintain grinding contact between the grinding wheel and the workpiece so as either to grind a concentric cylindrical region thereon or to grind an eccentric cylindrical region thereon as required, information about each selected region of the workpiece being stored in the computer memory which is addressed as appropriate so that the wheel feed can be controlled appropriately depending on whether a selected workpiece region is to be ground as a concentric or an eccentric cylindrical region.

The invention allows a workpiece having both concentric and eccentric cylindrical regions thereon to be ground on a single grinding machine without demounting the workpiece from the machine. This enables a workpiece to be left in place between centres whilst different regions therealong are ground to form cylindrical surfaces some of which are concentric with the primary axis of rotation of the workpiece, and others of which are eccentric relative thereto.

The invention is of particular application to the grinding of crankshafts which have journal bearing regions which have to be ground as cylindrical surfaces concentric with the primary axis of rotation of the crankshaft and crankpins which have to be ground as cylindrical surfaces eccentric to the primary axis of rotation.

(b) Correction For Process Induced Eccentricity

During the grinding of any workpiece, stresses and strains introduced by the grinding process particularly in unsupported regions of the workpiece, can cause a cylindrical region which is being ground to become eccentric relative to the primary workpiece axis. Whilst these eccentricities may be of minor consequence in the case of a significantly eccentric region such as a crankpin of a crankshaft, minor eccentricities in what should be concentric cylindrical surface such as a journal bearing surface of a crankshaft, will result in friction and wear in an engine in which such a crankshaft is mounted.

The invention allows for this problem to be overcome in that the control system can be programmed so as to not only distinguish between concentric and eccentric regions of a workpiece to enable the wheel feed to be controlled accordingly (so as to grind a cylindrical surface concentric with the primary axis of the workpiece or a cylindrical surface which is eccentric thereto), (ie whose axis is spaced from but parallel to the said primary axis) but is also capable of being controlled so as to introduce small advance and retract movements in the wheel feed whilst the grinding wheel is engaged in grinding a concentric cylindrical workpiece region, so as to introduce into the ground region an eccentricity in the cylindrical surface which is equal and opposite to any eccentricity which the grinding process per se introduces into the ground region, so that the two cancel out.

The invention also provides for the control system as aforesaid to be programmed to adjust the wheel feed program instructions or control signals when grinding eccentric cylindrical surfaces, so as to introduce an additional eccentricity which is equal and opposite to any stress induced eccentricity introduced into the eccentric cylindrical surface by the grinding process.

This technique of eccentricity compensation therefore may be extended to include not only the grinding of concentric cylindrical workpiece surfaces but also the grinding of eccentric cylindrical workpiece surfaces.

(c) Setting Up

A method of setting up such a grinding machine for grinding a composite workpiece with compensation for process induced eccentricity to concentric cylindrical regions comprises the steps of cylindrically grinding at least one concentric workpiece region to final form, measuring any unwanted eccentricity introduced by the grinding process together with the angular position(s) thereof in the said at least one workpiece region, and adjusting the wheel feed program, instructions or control signals stored in the computer controlling the grinding machine so that during subsequent workpiece grinding, the wheel feed is controlled so as to grind an equal and opposite eccentric form to that measured, thereby to cancel out process induced eccentricity.

Preferably the measuring of the workpiece region occurs after it has been stress relieved, which may be achieved merely by disengaging the grinding wheel, but may involve removing the workpiece from the grinding machine for gauging, then the careful replacement of the workpiece back in position.

Any unwanted eccentricity introduced into a workpiece by a grinding process will tend to vary from one position to another along the length of the workpiece, and will tend to increase with distance from a supported workpiece end. In consequence for example cylindrical journal bearing regions and crankpins near the centre of a crankshaft which is supported at opposite ends may require a greater degree of eccentricity compensation than is the case for those near to the two supported ends.

Where a plurality of such regions are to be ground at spaced apart positions axially along a workpiece which is supported at opposite ends, the setting up process may be performed for a concentric cylindrical region approximately midway along the said axial length of the workpiece, and proportionately reduced corrections are applied to the wheelfeed program instructions or control signals for similar cylindrical regions which are to be ground and which are displaced from the mid position towards the supported ends of the workpiece.

In an alternative method, it is possible to more fully take into account the variation in unwanted eccentricity introduced by grinding process forces along the axial length an elongate workpiece supported at opposite ends, such that regions towards the centre of the workpiece, tend to require a greater degree of eccentricity compensation during grinding than do those adjacent the supported ends thereof. This alternative method involves the steps of concentrically grinding all of the concentric surfaces of a workpiece without introducing any compensation for unwanted process induced eccentricity thereafter making measurements on the workpiece to determine the extent and angular position of an unwanted eccentricity for each of the ground regions, and separately adjusting the wheelfeed program instructions or control signals used to control the wheel feed during subsequent grinding of each said region of the same of a similar workpiece, so as to compensate individually for each said region for any process-induced eccentricity.

After such a setting up process has been performed and the original workpiece has been reground using the corrected wheelfeed program instructions or control signals a further check on the reground workpiece may be made and second order corrections may be made to the instructions or control signals, before regrinding the original workpiece or grinding further similar workpieces.

Measurements may be made subsequent to each further workpiece grinding to determine whether the corrections made from earlier measurements sufficiently compensate for any unwanted process induced eccentricity, and further corrections may be made to the wheelfeed program instructions or control signals as required. The process may be repeated until the measurements made on a test workpiece indicate that the unwanted eccentricity of each ground region is within desired limits. Thereafter the grinding machine wheelfeed may be controlled to grind further workpieces in accordance with the finally modified wheelfeed program instructions or control signals.

(d) Multiple Workpiece Measuring For Setting Up

Instead of producing only one workpiece on which measurements are made during setting up, it may be preferable at each stage to grind a number of workpieces which together form a sample, and to perform eccentricity measurements on the workpieces in each sample, and thereby determine the extent of any unwanted eccentricity both in terms of angular position and radial extent for each region of each workpiece in each sample, and to determine the mean unwanted eccentricity and mean angular position of such eccentricity for each sample, for use as the basis for the correction to the wheel feed control signals for subsequent grinding.

Where plural samples of workpieces are used to determine the corrections to be made, the process for determining what is to be the final set of control signals for the wheelfeel, can be terminated either if all of the measurements of unwanted eccentricity in all of the workpieces in a sample fall within desired limits, or if the mean of all the measurements of unwanted eccentricity fall within desired limits. The particular criterion used may depend upon the specification for the component concerned.

(e) Operational Modes of Machine Control System

According to a preferred feature of the invention, the control system for controlling the wheel feed may operate in different modes.

A first mode allows rapid advances and retraction of the grinding wheel, and rapid relative lateral movement of the wheel and the workpiece, to facilitate workpiece mounting and demounting and relative axial positioning of the wheel and the workpiece.

A second mode is provided for when the grinding wheel is grinding a concentric cylindrical region of a workpiece.

Here small unwanted eccentricity can be introduced by grinding process forces, the unwanted eccentricity can be compensated by introducing small complementary forward and backward movement of the grinding wheel in step with the rotation of the workpiece so as actually to grind the cylindrical region eccentrically relative to the primary workpiece axis, but by an amount just sufficient to cancel out the process induced eccentricity.

In a third mode the grinding wheel can be advanced and retracted through considerable distances in step with the rotation of the eccentric region of the workpiece as the latter is rotated, so as to follow the much greater eccentricity of an eccentric cylindrical workpiece surface (such as the crankpin of a crankshaft).

If correction of process induced eccentricity in the eccentric cylindrical surfaces is also required, a further mode is added to the known mode, in which the wheel feed control causes the wheel to follow the excessive eccentric rotation of an eccentric workpiece region, in which the eccentric following movement is corrected by smaller backward and forward shifts of the wheel correctly in step with the workpiece rotation so as to compensate for any unwanted process induced eccentricity introduced into the eccentric cylindrical surface by the grinding process.

(f) Grinding Methods Employing the Invention

The invention also lies in a method of grinding concentric and eccentric regions of similar composite workpieces by a computer controlled grinding machine comprising the steps of setting up modified wheelfeed program instructions or control signals by any of the aforesaid methods, and thereafter when grinding cylindrical surfaces of composite workpieces similar to that used in the setting up process, using the modified wheel feed program instructions or control signals derived from the setting up procedure, to control the wheelfeed drive.

By using a high speed CBN grinding wheel, it is possible to eliminate the rough machining step typically required before a fine grinding step to produce a bearing surface, thereby allowing a two stage grinding and polishing process to produce a finished product, instead of a three stage process.

The invention thus allows the known software controlled crankpin following facility incorporated computer controlled grinding machines to permit a grinding wheel to follow the relative eccessive eccentric movement of a crankpin during grinding as the crankshaft rotates, to be utilised, albeit acting at a smaller scale, to compensate for unwanted eccentricity introduced into cylindrically ground surfaces of a workpiece which should be concentric as a consequence of grinding process forces exerted, as such surfaces are ground and which tend to appear when the workpiece is stress relieved.

This aspect of the invention thus in effect provides for grinding of eccentric cylindrical surfaces of a workpiece in known manner, and eccentrically grinding cylindrical surfaces of the same workpieces which are to be concentric about the primary workpiece axis the degree of eccentricity being such that when a ground workpiece is stress relieved after grinding, the region in fact will be concentric relative to the primary axis of the workpiece.

Whilst the invention is of particular application to the grinding of crankpins and journal bearing regions on elongate crankshafts, it is to be understood that it is equally applicable to the grinding of any composite workpiece so as to remove eccentricity which the grinding process can introduce into the workpiece, and which becomes evident as the latter becomes unstressed.

(g) Grinding Machine

A computer controlled grinding machine for performing methods of grinding as aforesaid comprises a grinding wheel, drive means for rotating the wheel, wheelfeed drive means for advancing and withdrawing the grinding wheel towards and away from a workpiece region in a precise manner, computer means for controlling the wheelfeed drive means, which computer means includes memory means for storing programmable wheel feed instructions whereby the position of the wheel at each instant during a grinding process can be controlled, and program means loaded into the computer to control the wheel feed drive and the position of the grinding wheel so as to control, at selected region along the workpiece, the advance and withdrawal of the grinding wheel before during and after grinding each said region, so that eccentric and concentric cylindrical grinding of different workpiece regions may be performed without demounting the workpiece.

Where the grinding machine introduces unwanted eccentricity into concentrically ground cylindrical workpiece surfaces, the computer means may include memory means for storing correcting or corrected wheelfeed program instructions or control signals for use during the grinding of such regions, which correcting or corrected instructions or signals are obtained from any one of the setting up processes described above.

PRODUCTS PRODUCED BY THE PROCESS

The invention also lies in workpieces when made in accordance with any of the aforesaid methods or using the aforesaid grinding machine.

The invention will now be described by way of example with reference to the accompanying drawings, in which.

DETAILED DESCRIPTION OF THE DRAWING

Figure 1:
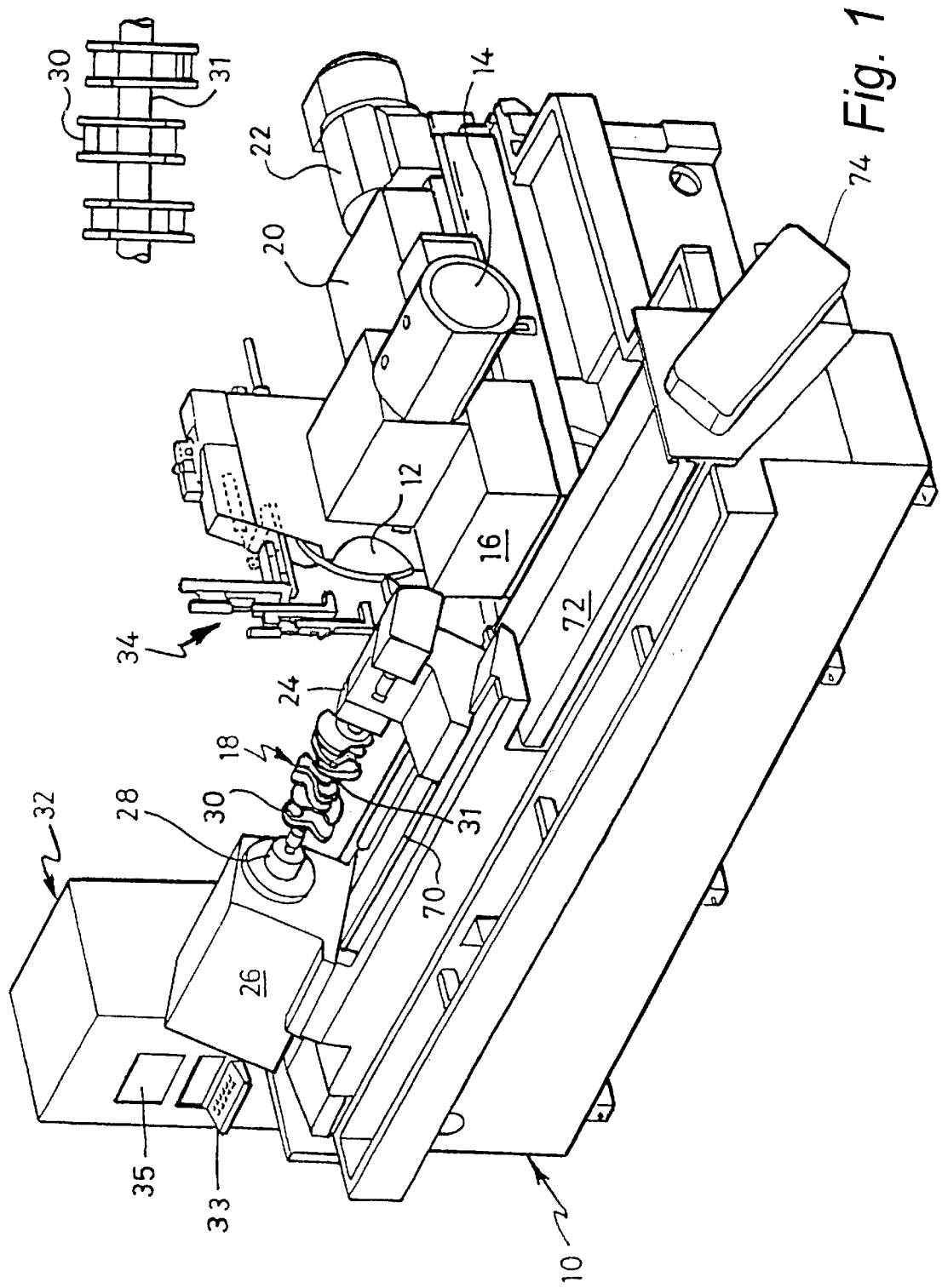
FIG. 1 illustrates a computer controlled grinding machine, fitted with an in process gauge.

FIG. 1 shows a grinding machine 10 having a grinding wheel 12 driven by a motor 14 and mounted on a wheelhead 16 for movement towards and away from a workpiece 18 along a linear track 20 under the control of the wheelfeed drive motor 22. The workpiece 18 is mounted on a carriage 70 itself slidable on a slideway 72 and driven therealong to position the workpiece relative to the wheel, via a drive 74. The workpiece is mounted between centers in a tailstock 24 and a headstock 26 (themselves mounted on the carriage 70). The headstock houses a motor (not shown) for rotating the workpiece 18 via a chuck 28. The workpiece shown is a crankshaft of an internal combustion engine and includes offset crankpins 30 (which are eccentric to the main workshaft axis), and cylindrical bearing regions 31, which are to be ground to size, each bearing region constituting a cylindrical workpiece region for grinding which should be concentric with the workpiece axis.

A computer 32 loaded with workpiece data and operating programs (such as are to be described) controls the operation of the machine and inter alia moves the wheelhead 16 towards and away from the workpiece 18 as the workpiece rotates, so as to maintain contact between the wheel and the journal bearing region being ground. Some data can be entered via the keyboard 33. Data/results/process steps can be displayed on the screen 35.

A gauge, generally designated 34, is carried by the wheel head assembly for gauging the diameter of the regions being ground. This can be done while the workpiece is rotated slowly, and preferably without the grinding wheel in contact, after grinding. The gauge is shown in its parked, non-operating position in FIG. 1. During gauging it is advanced so that the fingers of the gauge (described in more detail with reference to FIG. 2) are first located on the opposite side of the workpiece from the wheel 12, so that they can be lowered and moved back towards the wheel so as to be located above and below the workpiece, and then moved towards the latter until they touch it at diametrically opposite regions for gauging.

Figure 2:
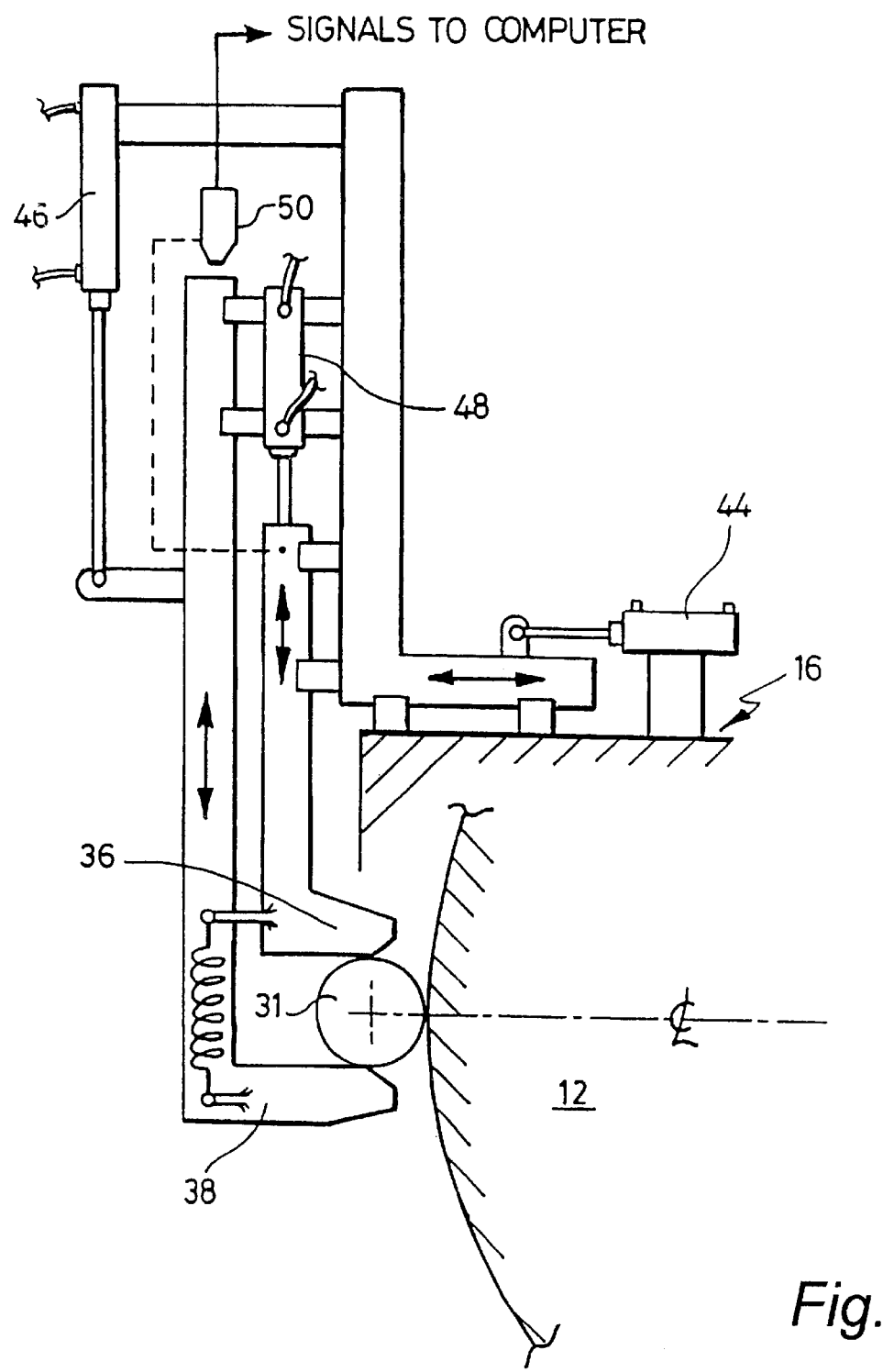
FIG. 2 is a side view of the gauge to an enlarged scale.

The gauge will allow the gauging of crankpins such as 30 as they are ground, but FIG. 2 shows how the fingers 36 and 38 can also engage a cylindrical bearing region 31. Pneumatic drives 44, 46 and 48 produce relative movement between the gauge assembly and the wheelhead 16, between the gauge assembly and the workpiece, and between the two fingers 36 and 38.

A sensor 50 determines the spacing between the fingers 36, 38 and provides a size signal for the computer 32, from which the diameter of the workpiece region between the fingers can be computed. The sensor can also provide a signal indicative of the linear oscillatory movement of the gauge fingers caused by any eccentricity in the ground region, by locking the two fingers 36, 38 together but spaced so as to just lightly clamp the workpiece therebetween, and rotating the latter slowly and observing any movement of 38 relative to sensor 50.

Figure 3:
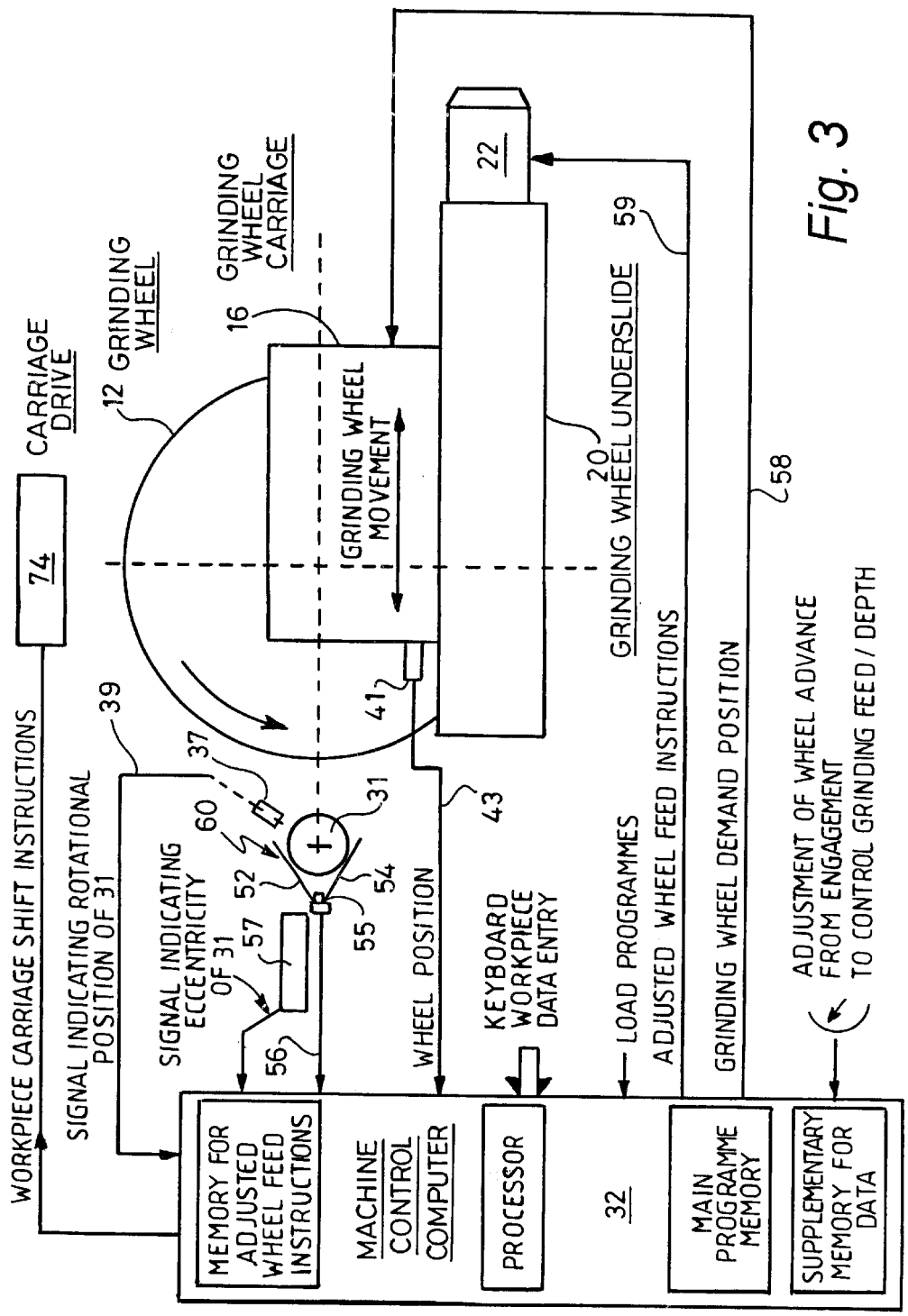
FIG. 3 is a diagrammatic illustration of how a gauge is controlled and in turn controls the grinding cycle, via the machine controlling computer.

FIG. 3 shows diagrammatically the grinding wheel 12, the wheelhead 16, the slide 20, and a different type of gauge from that shown in FIGS. 1 and 2. This engages a cylindrical bearing region 31 by means of two fixed converging fingers 52, 54, with a sensor 55 producing a signal from which the distance between the converging fingers at which the fingers make contact with the workpiece can be determined. The computer 32 receives the signal along line 56 and can compute therefrom the diameter of the workpiece region. Position and wheelhead drive signals from the computer 32 pass via line 59. Not shown are the signal paths from the computer 32 to the other drives for moving the gauge into and out of engagement and controlling the speed of rotation of the wheel and the crankshaft. Although developed to measure crankpin during grinding, this type of gauge can also be used to determine any eccentricity in the rotating workpiece region, by urging the gauge fingers 52, 54 into contact as shown and converting any in line movement of the gauge assembly 60, due to eccentricity, as the workpiece rotates into an appropriate electrical signal using a transducer such as 57.

Wheel position signals from a transducer/encoder 41 are passed to the computer 32 via line 43.

An encoder 37 or other transducer converts rotation of the cylindrical bearing region 31 of the workpiece 18 into angular informature. Signals along line 39 enable the phase of any eccentricity of 31 to be determined by the computer 32.

As described in our copending UK Application 9702550.6 which describes a method of guiding crankpins to size using in process gauging, a technique is also described to obtain a high quality surface finish and highly accurate diameters of ground components. This technique may also be used when grinding journal bearing regions. Thus during grinding, an initial fast wheelfeed may be used to roundout cylindrical bearing region 31, and the fast grinding feed stopped after a fixed feed amount independent of the gauge. At the end of the fast feed the gauge 34 is used by the machine control computer to sample the size of the region 31 and to check any eccentricity in magnitude and angular position as determined by the rotated position of the workpiece at which the eccentricity is noted. A prerequisite for the grinding cycle to proceed beyond this point is that this sample of size sensibly confirms that the gauge is on the region and functioning properly.

After computing the necessary control signal to compensate for any measured eccentricity the grinding feed restarts. A lower feed rate may be used.

In normal operation the feed will be stopped in response to signals derived from the wheel position and/or the in-process gauge 34 in a diameter measuring mode, and sampled by the machine control computer 32.

In a method, which involves in process gauging as the grinding feed proceeds towards a target size, near final size the instantaneous size of the region 31 being ground can be continuously sampled by the machine control computer.

If one or two or more consecutive samples of region 31 size, are found to be at or below the target size, the controlling computer immediately stops the grinding feed and initiates a feed dwell. This dwell, measured as N workpiece turns, permits the region being ground to achieve good geometric roundness and a stable size. This procedure gives an optimum response to fast grinding feeds commensurate with fast manufacturing times. During this feed dwell, typically two work revolutions, the controlling computer stores a number of consecutive samples of size measured at different angular positions relative to the gauge fingers so that it can calculate an average value of the workpiece region diameter.

At the completion of this dwell, the average diameter value may be calculated, and this value used to calculate the feed distance to achieve the desired final size of the region. The controlling computer then initiates an incremental feed to final size. At the start of this incremental feed, the gauge, having completed its work, can be retracted, with the object of minimising manufacturing time. Because the feed to final size is not being controlled by gauge, it does not have to be slow but can be optimized to to eliminate the build-up of machining vibrations and/or minimize machining time.

After a final "sparkout feed dwell", measured as n workpiece turns, the grinding wheel can be retracted, initially at a slow rate so as not to leave any grinding wheel breakaway mark, and then at a faster rate to minimize manufacturing time.

Alternatively, machining may be achieved without such in process gauging, simply by controlling the wheel feed and gauging components off-line, and correcting for process induced eccentricity in accordance with the present invention and for wheel wear by appropriate adjustment as the grinding of a batch of workpieces progresses.

Figure 4:
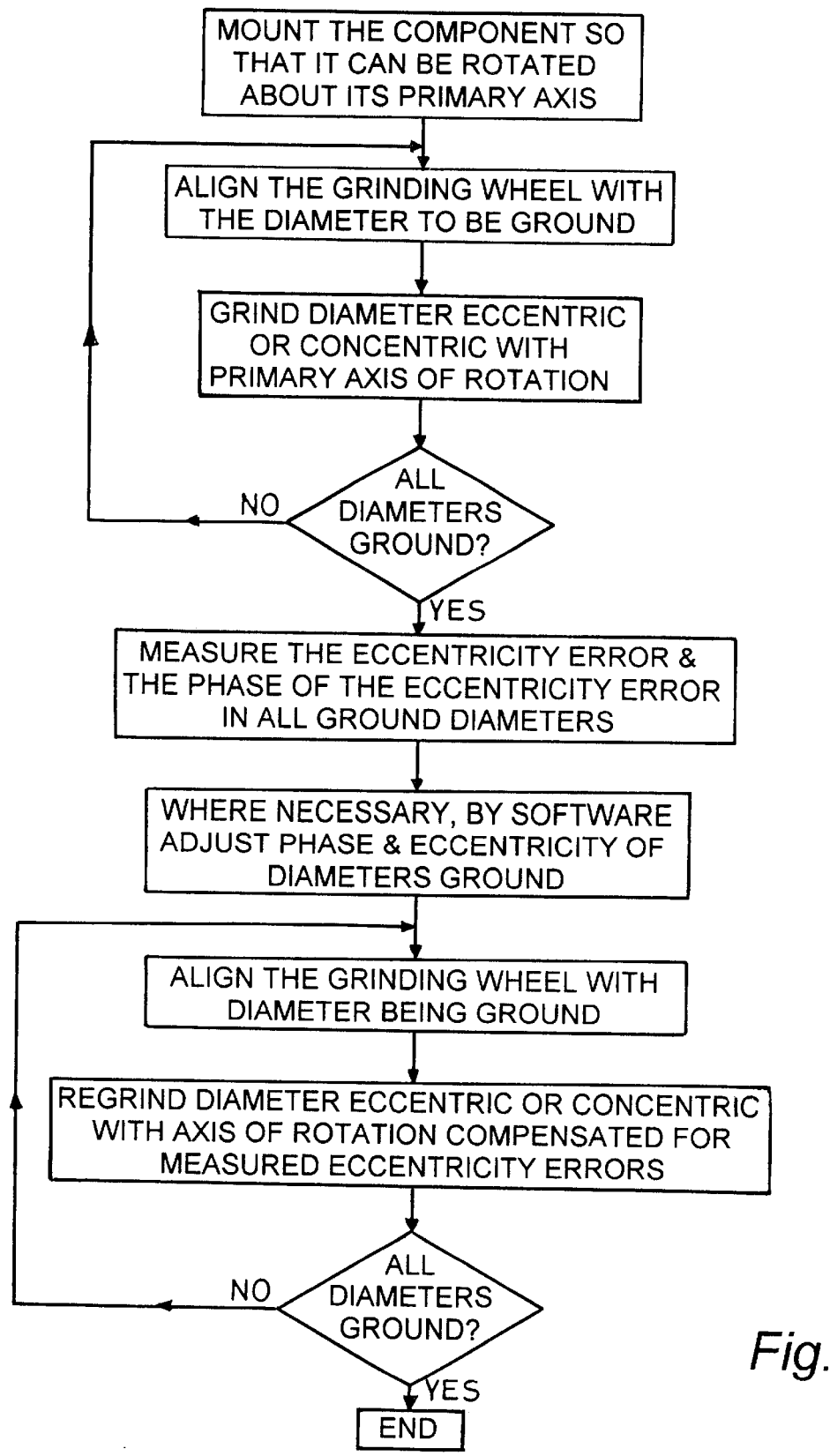
FIG. 4 an example of the grinding process steps of one method according to the invention.

FIG. 4 illustrates the steps of a method of grinding an elongate component having a number of different regions therealong which are to be cylindrically ground either concentrically or eccentrically to the primary axis of the component, and in which process induced eccentricity is corrected for all such regions whether ground to be concentric or eccentric to the primary axis.

Detailed program steps required to set up and operate a grinding machine in different ways in accordance with different aspects of the invention, so as to allow so-called composite workpieces to be ground on the same computer controlled grinding machine, with or without correction for process induced eccentricity, are now listed, on the following pages.

The lists of controlled operations which follow illustrate the steps which the machine controlling computer must initiate the inputs it must respond to, and the decisions it must make, under the control of programs loaded into its memory, so as to adjust the wheelfeed program instructions or control signals and other machine parameters, and parts, so as to set up the machine to therafter grind a composite workpiece such as a crankshaft in accordance with different methods embodying the invention, as detailed.

A brief explanation of the process to which the steps relate is provided at the head of each listing.

I. Instructions for setting up and running a computer controlled grinding machine to grind similar composite workpieces without eccentricity correction of cylindrically ground regions of the workpiece
1. Load composite workpiece data into machine computer
2. Load wheelfeed routines into machine computer
3. Identify axial positions of workpiece regions to be ground
4. Mount workpiece
5. Rotate workpiece for grinding
6. Align grinding wheel with region to be ground
7. Determine from workpiece data how region is to be ground
8. If concentric grinding, go to 9; if eccentric go to 28
9. Select concentric wheelfeed grinding routine
10. Advance wheel to engage workpiece region
11. Compute wheel position to achieve a target diameter
12. Grind and measure wheel advance from engagement
13. Stop wheelfeed at target diameter position
14. Disengage wheel
15. Apply gauge and measure ground diameter
16. Adjust wheelfeed instructions to achieve final diameter
17. Compute wheel position to achieve final diameter
18. Advance wheel to engage workpiece
19. Grind and measure wheel advance from engagement
20. Stop wheelfeed when computed position is achieved
21. Retract wheel
22. More regions to grind? Yes or No
23. If Yes, go to 6; if No go to 24
24. Demount workpiece
25. More workpieces? Yes or No
26. If Yes, go to 4; if No, go to 27
27. Enter standby mode
28. Select eccentric wheelfeed grinding routine
29. Go to 10

II. Instructions for setting up and grinding a computer controlled grinding machine to grind similar composite workpieces with eccentricity correction of cylindrically ground concentric regions thereof
1. Load composite workpiece data into machine computer
2. Load wheelfeed routines into machine computer
3. Identify axial positions of workpiece regions to be ground
4. Mount workpiece
5. Rotate workpiece for grinding
6. Align grinding wheel with region to be ground
7. Determine from workpiece data how region is to be ground
8. If concentric grinding, go to 9; if eccentric go to 31
9. Select concentric grinding wheelfeed routine
10. Advance wheel to engage workpiece region
11. Compute wheel position to achieve a target diameter
12. Grind and measure wheel advance from engagement
13. Stop wheelfeed at target diameter position
14. Disengage wheel
15. Rotate workpiece slowly
16. Gauge ground region and store diameter
17. Identify any eccentricity and its rotational position
18. Adjust selected wheelfeed routine for eccentricity
19. Compute wheel position to achieve final diameter
20. Rotate workpiece for grinding
21. Advance wheel and engage workpiece region
22. Regrind using adjusted routine and measure wheel advance
23. Stop wheelfeed when computed position is achieved
24. Retract wheel
25. More regions to grind? Yes or No
26. If Yes, go to 6; if No, go to 27
27. Demount workpiece
28. More workpieces? Yes or No
29. If Yes go to 4; if No go to 30
30. Enter standby mode
31. Select eccentric grinding wheelfeed routine
32. Advance wheel to enage workpiece region
33. Compute wheel position to achieve target diameter
34. Grind and measure wheel advance and engagement
35. Stop wheelfeed at computed position
36. Disengage wheel from eccentric workpiece region
37. Apply gauge and measure diameter of eccentric region
38. Adjust wheelfeed to achieve final diameter
39. Compute wheel position to achieve final diameter
40. Advance wheel to engage eccentric workpiece region
41. Grind and measure wheel advance from engagement
42. Stop wheelfeed when computed position is achieved
43. Retract wheel and go to 25

What is claimed is:
1. A method of grinding a composite workpiece to form a component having concentric and eccentric cylindrical regions, comprising, mounting the workpiece for rotation about a primary axis in a computer controlled grinding machine, the grinding machine having a grinding wheel the advance and withdrawal of which is controllable by a program entered into the machine controlling computer, loading wheelfeed controlling program into the computer, positioning the grinding wheel relative to the workpiece, or the workpiece relative to the grinding wheel, so that the wheel is aligned with a first selected region of the workpiece, advancing the grinding wheel towards the selected region so as to grind the surface thereof, controlling a wheelfeed so as to maintain grinding contact between the grinding wheel and the workpiece so as either to grind a concentric cylindrical region thereon or an eccentric offset cylindrical region thereon as required, information about each selected region of the workpiece being stored in the computer and addressed as appropriate so that the wheelfeed can be controlled appropriately depending on whether a selected workpiece region is to be ground as a concentric or an eccentric offset cylindrical region, in which the wheelfeed controlling program is programmed so as to be able to distinguish between concentric and eccentric regions of a workpiece from workpiece data stored therein to enable the wheelfeed to be controlled accordingly so as to grind as required a cylindrical surface concentric with a primary axis of the workpiece or a cylindrical surface which is eccentric thereto, whose axis is spaced from but parallel to the said primary axis, and which is also programmed to introduce small advance and retract movements in the wheelfeed while the grinding wheel is engaged in grinding a concentric cylindrical workpiece region so as to introduce into the ground region an opposing eccentricity in the cylindrical surface which is equal and opposite to any eccentricity which grinding process forces introduce into the ground region, so that the two eccentricities cancel out.

2. The method of claim 1, when used to grind a crankshaft which has journal bearing regions which have to be ground as cylindrical surfaces concentric with the primary crankshaft axis and crankpins which have to be ground as cylindrical surfaces offset from and eccentric to the primary crankshaft axis.

3. A method of grinding a workpiece having both concentric and eccentric offset cylindrical regions thereon using a single grinding machine under computer control without demounting the workpiece from the machine, in which the computer is loaded with data about the workpiece, how different regions are to be ground, and wheelfeed instructions, and the grinding process is adjusted for each region as detailed by the workpiece and region data stored in the computer, thereby enabling a workpiece to be left in place between centers while different regions therealong are ground to form cylindrical surfaces some of which are concentric with a primary axis of rotation of the workpiece and others of which are eccentric offset thereto, in which control is programmed so as to be able to distinguish between concentric and eccentric regions of a workpiece from workpiece data stored therein to enable a wheelfeed to be controlled accordingly so as to grind as required a cylindrical surface concentric with a primary axis of the workpiece or a cylindrical surface which is eccentric thereto, whose axis is spaced from but parallel to the said primary axis, and which is also programmed to introduce small advance and retract movements in the wheelfeed while a grinding wheel is engaged in grinding a concentric cylindrical workpiece region so as to introduce into the ground region an opposing eccentricity in the cylindrical surface which is equal and opposite to any eccentricity which grinding process forces introduce into the ground region, so that the two eccentricities cancel out.

4. A computer controlled grinding machine for grinding a composite workpiece comprising a grinding wheel, drive means for rotating the wheel, wheelfeed drive means for advancing and withdrawing the grinding wheel towards and away from a workpiece region in a precise manner, computer means for controlling the wheelfeed drive means, which computer means includes memory means for storing programmable wheelfeed instructions whereby the position of the wheel at each instant during a grinding process can be controlled, program means loaded into the computer to control the wheelfeed drive and the position of the grinding wheel, or the workpiece, so as to control, at selected regions along the workpiece, the advance and withdrawal of the grinding wheel before during and after grinding each said region, so that eccentric and concentric cylindrical grinding of different workpiece regions may be performed without demounting the workpiece, wherein the grinding process introduces unwanted eccentricity into concentrically ground cylindrical workpiece surfaces of the composite workpiece, and the computer means includes memory means for storing corrected wheelfeed program instructions or signals for use during the grinding of such regions.

5. A computer controlled grinding machine according to claim 4, the machine being adapted to modify basic wheelfeed commands which unmodified will control the wheelfeed to grind an eccentric cylindrical surface, so as to introduce an additional eccentricity which is equal and opposite to any stress-induced eccentricity introduced into the eccentric cylindrical surface by the grinding process.

6. A method of setting up a computer controlled grinding machine for grinding concentric and eccentric cylindrical regions of an elongate composite workpiece, the workpiece being supported at its opposite ends for grinding thereof, in which axial variations in unwanted eccentricity introduced by the grinding process are taken into account, such that regions towards the center of the workpiece tend to require a greater degree of eccentricity compensation than do those adjacent said opposite ends, said method comprising the steps of advancing a grinding wheel towards a selected region so as to selectively grind either a concentric or an eccentric cylindrical region thereon as required, cylindrically grinding all of said concentric cylindrical regions of the workpiece without introducing any compensation for unwanted process-induced eccentricity, thereafter making measurements on the workpiece to determine the extent and angular position of any unwanted eccentricity for each of the ground regions, and separately adjusting wheelfeed program instructions or control signals to be used to control wheelfeed during subsequent grinding of each said concentric or eccentric region of the same or similar workpieces, so as to compensate individually for each said region for any process-induced eccentricity.

7. A method as claimed in claim 6, wherein after the setting up process has been performed the original workpiece is reground using the wheelfeed instructions or control signals, and a further gauging is performed on the reground workpiece and second order corrections are made to the program instructions or control signals, before regrinding the original workpiece or grinding further similar workpieces.

8. A method of grinding cylindrical surfaces of a crankshaft having concentric and eccentric cylindrical regions which uses a software controlled crankpin following facility incorporated into a computer controlled grinding machine to permit a grinding wheel to follow the relatively excessive eccentric movement of the crankpins of the crankshaft during the grinding of the crankshaft as the crankshaft rotates, and which at a smaller scale introduces a complementary eccentricity for removing unwanted eccentricity introduced into the concentric cylindrically ground surfaces of the crankshaft as a consequence of grinding process forces exerted as such surfaces are ground, and which tends to appear after the crankshaft is stress relieved, so as to cancel out the grinding process induced eccentricity.

9. A method of operating a computer controlled grinding machine to grind a composite workpiece, using a grinding wheel so as to eccentrically grind a region of the workpiece which is to have a concentric cylindrical surface relative to the workpiece primary axis after grinding, rather than concentrically grinding the said region, the degree of eccentricity being such that when the ground workpiece is stress relieved after grinding, the region will be concentric relative to the primary axis of the workpiece, and wherein a similar computer control of wheelfeed albeit at a larger scale is employed to allow eccentric offset cylindrical surfaces of the workpiece also to be ground, using said wheel on the grinding machine.

10. Composite workpieces when made in accordance with the method of grinding a composite workpiece to form a component having concentric and eccentric cylindrical regions, comprising, mounting the workpiece for rotation about a primary axis in a computer controlled grinding machine, the grinding machine having a grinding wheel the advance and withdrawal of which is controllable by a program entered into the machine controlling computer, loading a wheelfeed controlling program into the computer, positioning the grinding wheel relative to the workpiece, or the workpiece relative to the grinding wheel, so that the wheel is aligned with a first selected region of the workpiece, advancing the grinding wheel towards the selected region so as to grind the surface thereof, controlling a wheelfeed so as to maintain grinding contact between the grinding wheel and the workpiece so as either to grind a concentric cylindrical region thereon or an eccentric offset cylindrical region thereon as required, information about each selected region of the workpiece being stored in the computer and addressed as appropriate so that the wheelfeed can be controlled appropriately depending on whether a selected workpiece region is to be ground as a concentric or an eccentric offset cylindrical region, in which the wheelfeed controlling program is programmed so as to be able to distinguish between concentric and eccentric regions of a workpiece from workpiece data stored therein to enable the wheelfeed to be controlled accordingly so as to grind as required a cylindrical surface concentric with a primary axis of the workpiece or a cylindrical surface which is eccentric thereto, whose axis is spaced from but parallel to the said primary axis, and which is also programmed to introduce small advance and retract movements in the wheelfeed while the grinding wheel is engaged in grinding a concentric cylindrical workpiece region so as to introduce into the ground region an opposing eccentricity in the cylindrical surface which is equal and opposite to any eccentricity which grinding process forces introduce into the ground region, so that the two eccentricities cancel out.

11. A computer program for setting up a computer controlled grinding machine to set up wheelfeed instructions to control the grinding of composite workpieces comprising the following steps:
1. Load composite workpiece data into machine computer
2. Load wheelfeed routines into machine computer
3. Identify axial positions of workpiece regions to be ground
4. Mount workpiece
5. Rotate workpiece for grinding
6. Align grinding wheel with region to be ground
7. Determine from workpiece data how region is to be ground
8. If concentric grinding, go to 9; if eccentric go to 28
9. Select concentric wheelfeed grinding routine
10. Advance wheel to engage workpiece region
11. Compute wheel position to achieve a target diameter
12. Grind and measure wheel advance from engagement
13. Stop wheelfeed at target diameter position
14. Disengage wheel
15. Apply gauge and measure ground diameter
16. Adjust wheelfeed instructions to achieve final diameter
17. Compute wheel position to achieve final diameter
18. Advance wheel to engage workpiece
19. Grind and measure wheel advance from engagement
20. Stop wheelfeed when computed position is achieved
21. Retract wheel
22. More regions to grind? Yes or No
23. If Yes, go to 6; if No go to 24
24. Demount workpiece
25. More workpieces? Yes or No
26. If Yes, go to 4; if No, go to 27
27. Enter standby mode
28. Select eccentric wheelfeed grinding routine
29. Go to 10.

12. A computer program for setting up and operating a computer controlled grinding machine to grind similar composite workpieces with eccentricity correction of concentrically ground regions, comprising the steps of:
1. Load composite workpiece data into machine computer
2. Load wheelfeed routines into machine computer
3. Identify axial positions of workpiece regions to be ground
4. Mount workpiece
5. Rotate workpiece for grinding
6. Align grinding wheel with region to be ground
7. Determine from workpiece data how region is to be ground
8. If concentric grinding, go to 9; if eccentric go to 31
9. Select concentric grinding wheelfeed routine
10. Advance wheel to engage workpiece region
11. Compute wheel position to achieve a target diameter
12. Grind and measure wheel advance from engagement
13. Stop wheelfeed at target diameter position
14. Disengage wheel
15. Rotate workpiece slowly
16. Gauge ground region and store diameter
17. Identify any eccentricity and its rotational position
18. Adjust selected wheelfeed routine for eccentricity
19. Compute wheel position to achieve final diameter
20. Rotate workpiece for grinding
21. Advance wheel and engage workpiece region
22. Regrind using adjusted routine and measure wheel advance
23. Stop wheelfeed when computed position is achieved
24. Retract wheel
25. More regions to grind? Yes or No
26. If Yes, go to 6; if No, go to 27
27. Demount workpiece
28. More workpieces? Yes or No
29. If Yes go to 4; if No go to 30
30. Enter standby mode
31. Select eccentric grinding wheelfeed routine
32. Advance wheel to enage workpiece region
33. Compute wheel position to achieve target diameter
34. Grind and measure wheel advance and engagement
35. Stop wheelfeed at computed position
36. Disengage wheel from eccentric workpiece region
37. Apply gauge and measure diameter of eccentric region
38. Adjust wheelfeed to achieve final diameter
39. Compute wheel position to achieve final diameter
40. Advance wheel to engage eccentric workpiece region
41. Grind and measure wheel advance from engagement
42. Stop wheelfeed when computed position is achieved
43. Retract wheel and go to 25.

* * * * *